2,664,323

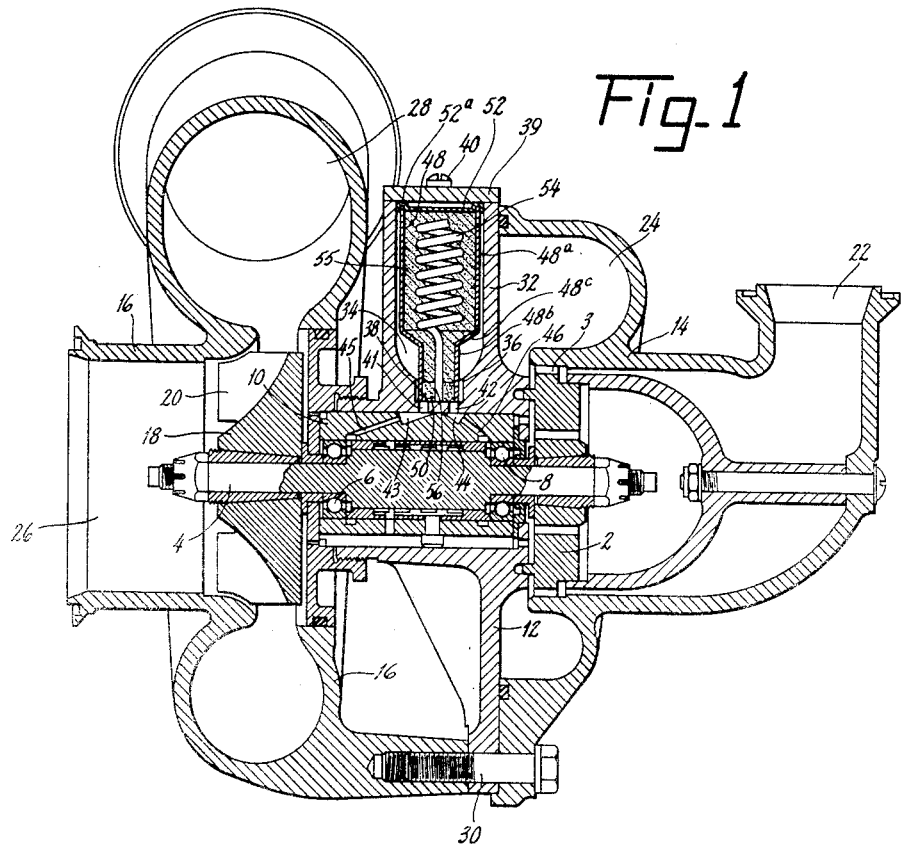
Fig. 1
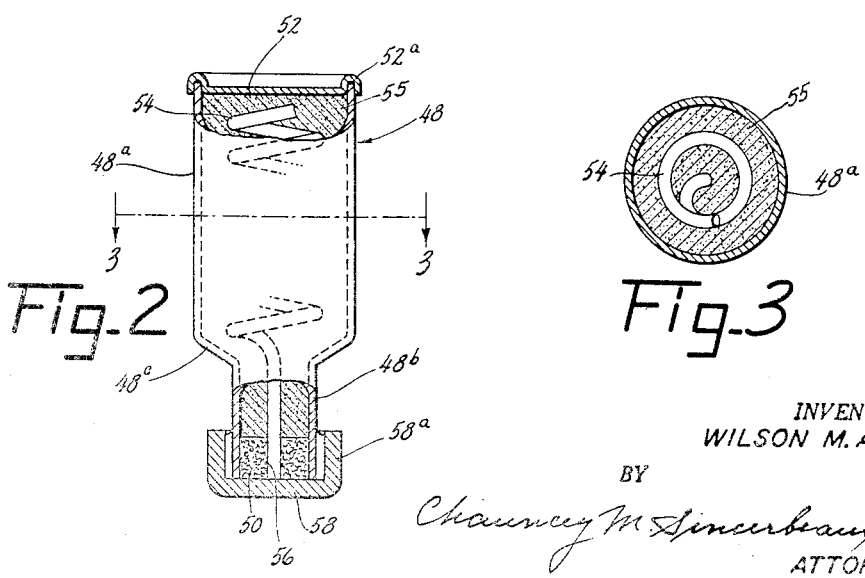
Fig. 2
Fig. 3
INVENTOR.
WILSON M. ALFORD
BY
Chauncey M Sincerbeaux
ATTORNEY Patented Dec. 29, 1953

UNITED STATES PATENT OFFICE 2,664,323

LUBRICATING MECHANISM

Wilson M. Alford, Windsor, Conn., assignor to United Aircraft Corporation, East Hartford, Conn., a corporation of Delaware Application October 17, 1952, Serial No. 315,239

14 Claims. (Cl. 308—125)

This invention relates to lubricating mechanism for supplying lubricating fluid to the bearings of rotating parts of mechanisms.

The invention is illustrated in this application as embodied in a mechanism for supplying lubricating fluid to the bearings of a turbine rotor and fan for an air conditioning unit. It is to be understood, however, that the invention is not limited, in its application, to any particular machine or type of machine but that it may be applied, with advantage to various machines.

One object of the invention is to improve the construction of lubricating mechanisms for high speed bearings.

Another object of the invention is to provide lubricating mechanisms with a novel combination of parts which may be applied to and removed from the other parts of the mechanism as a unit thereby facilitating greatly the assembly and disassembly of the mechanism.

The invention is disclosed in this application as embodied in a lubricating mechanism of the type comprising a reservoir containing a charge of oil bleeding grease and devices associated with the reservoir for effecting and controlling the flow of oil from the reservoir. With a lubricating mechanism of this type, when the mechanism is "overhauled" as is required at intervals, the grease remaining in the reservoir, from which a large proportion of the oil has bled, is cleaned out, certain of the devices associated with the reservoir for effecting and controlling the flow of oil are removed and discarded, a new set of such devices is assembled with the reservoir and a supply of fresh grease is introduced into the reservoir. This is a messy operation and requires considerable labor and time. When a mechanism of this type is installed in an airplane, access to the lubricant reservoir is often obstructed so that the cleaning of the reservoir, the installation of the new elements and the introduction of a charge of grease into the reservoir is particularly difficult.

Another object of the invention is to improve the construction of lubricating mechanisms of the latter type with a view of avoiding the disadvantage above pointed out.

The invention is shown in this application as embodied in a mechanism in which the oil is fed from an oil bleeding grease by means of a wick distributed through the grease. The grease preferably employed in this mechanism is of a character such that the oil separates from the grease when the grease is at a temperature slightly below operating temperature of the mechanism but well above ambient temperature and that when the grease is at ambient temperature, the separation of the oil is greatly reduced or substantially arrested.

The invention will be clearly understood from the accompanying drawings illustrating a construction embodying the invention in its preferred form and the following detailed description of the construction therein shown.

In the drawings, Fig. 1 is a view in vertical section illustrating a lubricating mechanism embodying the invention applied to a refrigerating unit for the air conditioning systems of high speed airplanes.

Fig. 2 is a detail view partly in side elevation and partly in section illustrating a combination or assembly of elements including a lubricant holding casing or cartridge and certain associated parts, and Fig. 3 is a detail view in horizontal section taken substantially in a plane containing the line 3—3 of Fig. 2.

The mechanism illustrated in the drawings comprises a turbine rotor 2 having blades 3 and secured to one end portion of a rotary shaft 4 mounted to rotate upon spaced sets of ball bearings 6 and 8 supported within a sleeve 10 fixed in a suitable housing 12, located between the turbine housing 14 and the compressor housing 16, these bearings supporting the opposite ends of the shaft. Upon the end portion of the shaft 4, opposite that upon which the turbine is mounted, an impeller 18 is secured. This impeller is provided with blades 20.

The turbine rotor 2 is driven by air, usually at an elevated temperature, introduced into the air inlet 22 and discharged at a reduced temperature through the outlet 24. The rotor drives the impeller 18 the blades of which draw air through an inlet 26 in the compressor housing 16 and causes the discharge of the same at an elevated temperature through a discharge outlet 28.

The central housing 12, the turbine housing 14 and the compressor housing 16 are secured together in the relations shown in Fig. 1 by means of a series of cap screws 30 of which one is shown in Fig. 1.

The mechanism thus far described has substantially the same construction arrangement and mode of operation of parts as the corresponding mechanism shown and described in the pending application of William E. Diefenderfer, Serial No. 236,029.

The central housing 12 is constructed with a portion 32 extending upwardly above the sleeve 10 preferably substantially cylindrical in horizontal cross section to form a cylindrical chamber 34 for the reception of an assembly of parts including a grease containing casing or cartridge. The chamber 34 is provided, at its lower end with a recess 36 terminating in a substantially horizontal lower face 38. The chamber is provided with a removable cover 39 held in place by cap screws 40.

The housing 12 is formed with a series of oil conducting tubes or conduits 41 and 42 through which oil from the lower end of the recess 36 flows by gravitational action respectively into recesses or troughs 43 and 44 connected with the lower ends of said tubes. The sleeve 10 is formed with inclined conduits 45 and 46 through which the oil collected respectively in the troughs 43 and 44 flows by gravitational action to the respective ball bearings 6 and 8.

In the illustrated construction in order to facilitate the original assembly of the mechanism and the overhaul of the mechanisms at intervals, a combination or assembly of elements is provided including a grease containing cartridge or casing and certain devices for effecting a flow of oil from the casing varying with the temperature. This combination of elements is inserted in the chamber 34 as a unit in the original assembly of the mechanism. At overhaul time, this combination is removed from the chamber as a unit to allow the substitution of another combination of like elements.

This combination or assembly comprises a casing or cartridge 48 preferably having a cylindrical body 48a arranged to fit fairly closely in the cylindrical chamber 34. The casing is formed with a substantially cylindrical end portion 48b of greatly reduced diameter as compared with the body 48a connected with the body by a conical portion 48c. Within the outer end of the reduced portion 48b of the casing is fitted a disk 50 of felt or other suitable oil absorbent material. The casing is provided with a cover indicated at 52 secured to the upper margin of the body of the casing. The casing is filled with grease indicated at 55 and a wick 54 of suitable fibrous material and preferably substantially circular in cross section is uniformly distributed in the casing. The wick is arranged in spiral coils extending about the axis of the casing and the lower end thereof is connected, in oil transferring relation, to the felt disk 50. To this end, the disk 50 is provided with a central opening 56 and the lower end of the wick is inserted in this opening, the wick being arranged to fit closely in the opening so as to maintain an intimate contact with the disk.

The wick is coiled in the casing at the time that the casing is filled with grease. A grease preferably comprising an intimate mixture or emulsion of a lime-soda base soap and oil is used. The character of the mixture is preferably such that oil bleeds from the soap at elevated temperatures such as 180° to 200° F., but, at ambient temperatures under 100° to 120° F., the mixture congeals and the oil does not bleed at all from the soap or at most, bleeds very slowly therefrom. It has been found that, in actual practice, a grease which will bleed about .7 percent of the oil in 100 hours at 70° F. and which will bleed about 8 percent of the oil in 100 hours at 200° F. is satisfactory for use in the present mechanism.

In the initial assembly of the mechanism, the combination of the casing 48, the felt disk 50, the wick 54, the grease within the casing, and the cover 52 for the casing are all completely assembled outside the chamber 34 and are placed in said chamber in the operating position shown in Fig. 1 as a unit. When located in this position, the reduced portion 48b of the casing is engaged in the recess 36 and the lower edge of said reduced portion, the felt disk 50 and the portion of the wick located within the central opening in the disk all engage the lower face 38 of the recess. The casing 48 is supported in the chamber by its engagement with said face 38 of the recess. The cover 39 for the chamber, when secured in position as shown in Fig. 1, engages the cover 52 of the casing and holds the assembly securely in position.

With this construction, oil bleeding from the grease is absorbed by the wick 54 and is transferred by capillary action to the felt disk 50. Oil bleeding from the grease also is absorbed directly by the disk through the contact of the grease with the upper portion of the disk. The oil absorbed by the disk flows downwardly through the tubes 41 and 42 into the troughs 43 and 44 and thence passes downwardly through the conduits 45 and 46 to the bearings 6 and 8 to lubricate uniformly these bearings.

At overhaul time the cover 39 for the chamber 34 is removed and the combination or assembly comprising the casing 48 with the cover 52, the disk 50, the wick 54 and whatever grease may be left in the casing is removed as a unit from the chamber and discarded. A new combination or assembly comprising a casing 48 and cover 52 together with a felt disk 50 and wick 54 and a supply of grease substantially filling the casing is then inserted as a unit in the chamber in operative position as shown in Fig. 1. The assembly is secured in position by applying the cover 39 to the structure in engagement with the cover 52 and attaching the cover 39 in place.

Thus the present construction facilitates the initial assembly of the lubricating mechanism and the providing of the same with a supply of grease. The construction is of especial advantage in that, at overhaul time, it avoids the necessity of cleaning out the old grease from the grease supply chamber and associated parts and provides a fresh supply of grease and a new set of devices for absorbing the oil bleeding from the grease and transferring the same to the conduits by which the oil is carried by gravity to the bearings.

In the present construction, at overhaul time, a great deal of time and labor is saved over that which would be required to clean out the old grease in the reservoir, to install a new set of devices for effecting and controlling the flow of oil from the reservoir and to recharge the reservoir with grease, and the messiness of the latter operation is avoided.

Fig. 2 shows the combination including the casing 48, the cover 52, the disk 50, the wick 54 and the charge of grease in the casing all assembled outside the remainder of the mechanism. In order to enable this combination to be stored or transported without leakage of oil, a closure 58 is provided to cover the opening at the outer end of the portion 48b of the casing. This closure has the form shown in cross section in Fig. 2 and fits over the end portion 48b of the casing. The closure is secured on the casing preferably by contracting the wall 58a of the closure about the portion of the casing within the same.

As shown clearly in Fig. 2, the cap 52 is provided with a peripheral portion 52a which embraces the upper marginal portion of the casing 48 and the cap is preferably secured to the casing by compressing this peripheral portion on the said marginal portion of the casing.

It is to be understood, that, except as defined in the claims, the invention is not limited to the particular construction of the illustrated embodiment of the invention but that the invention may be embodied in other forms within the scope of the claims.

Having explained the nature and object of the invention and having specifically described a construction embodying the invention in its preferred form, what is claimed is:

1. In a mechanism of the character described having a bearing, an element rotatably supported by said bearing, a structure providing a receiving chamber associated with said bearing, an assembly mounted in said chamber and removable as a unit therefrom and including a casing for containing lubricant having an oil outlet, an oil absorbent pad connected with said casing and extending across said outlet and a wick distributed in the casing and having an oil transferring connection with said pad, said mechanism having means for leading oil from said chamber to said bearing.

2. In a mechanism of the character described having a bearing, an element rotatably supported by said bearing, a structure providing a receiving chamber associated with said bearing, an assembly mounted in said chamber and removable as a unit therefrom and including a casing for containing lubricant having an oil outlet, an oil absorbent pad connected with said casing and extending across said outlet, a quantity of lubricant in said casing, and a wick distributed in the lubricant in the casing and having an oil transferring connection with said pad, said mechanism having means for leading oil from said chamber to said bearing.

3. In a mechanism of the character described having a bearing, an element rotatably supported by said bearing, a structure providing a receiving chamber associated with said bearing, an assembly mounted in said chamber and removable as a unit therefrom and including a casing for containing lubricant having an oil outlet, an oil absorbent pad connected with said casing and extending across said outlet, an oil bleeding grease in said casing, and a wick distributed in the grease in the casing and having an oil transferring connection with said pad, said mechanism having means for leading oil from said chamber to said bearing.

4. In a mechanism of the character described having a bearing, an element rotatably supported by said bearing, a structure providing a receiving chamber having a lower contact face, an oil passage extending through said contact face, and means for conducting oil from said oil passage to the bearing, a disposable assembly mounted in said chamber and removable as a unit therefrom and including a cartridge for holding lubricant mounted in said chamber and supported by the engagement of the lower portion thereof with said contact face and having an outlet in said portion through which oil is delivered into said oil passage, an oil absorbent member connected with said cartridge and extending across said outlet and a wick distributed in said cartridge and having an oil transferring connection with said oil absorbent member.

5. In a mechanism of the character described having a bearing, an element rotatably supported by said bearing, a structure providing a receiving chamber having a lower contact face, an oil passage extending through said contact face, and means for conducting oil from said oil passage to the bearing, a disposable assembly mounted in said chamber and removable as a unit therefrom and including a cartridge for holding lubricant mounted in said chamber and supported by the engagement of the lower portion thereof with said contact face and having an outlet in said portion through which oil is delivered into said oil passage, an oil absorbent member connected with said cartridge and extending across said outlet in engagement with said contact face and a wick distributed in said cartridge and having an oil transferring connection with said oil absorbent member.

6. In a mechanism of the character described having a bearing, an element rotatably supported by said bearing, a structure providing a receiving chamber having a lower contact face, an oil passage extending through said contact face, and means for conducting oil from said oil passage to the bearing, a disposable assembly mounted in said chamber and removable as a unit therefrom and including a cartridge for holding lubricant mounted in said chamber and supported by the engagement of the lower portion thereof with said contact face and having an outlet in said portion through which oil is delivered into said oil passage, an oil absorbent member connected with said cartridge, and extending across said outlet in engagement with said contact face a charge of lubricant in said cartridge and a wick distributed in the lubricant in said cartridge and having an oil transferring connection with said oil absorbent member.

7. In a mechanism of the character described having a bearing, an element rotatably supported by said bearing, a structure providing a receiving chamber having a lower contact face, an oil passage extending through said contact face, and means for conducting oil from said oil passage to the bearing, a disposable assembly mounted in said chamber and removable as a unit therefrom and including a cartridge for holding lubricant mounted in said chamber and supported by the engagement of the lower portion thereof with said contact face and having an outlet in said portion through which oil is delivered into said oil passage, an oil absorbent member connected with said cartridge and extending across said outlet, a charge of oil bleeding grease in said cartridge and a wick distributed in the grease in said cartridge and having an oil transferring connection with said oil absorbent member.

8. In a mechanism of the character described having a bearing, an element rotatably supported by said bearing, a structure associated with said bearing and shaped to provide a receiving chamber having a lower contact face, an oil passage through said contact face and means for conducting oil from said passage to said bearing, a combination of elements mounted in said chamber and removable as a unit therefrom and comprising a casing for holding lubricant shaped to be placed in said chamber and having a lower portion engaging and supported by said contact face and formed with an outlet opening upon said contact face, an oil absorbent element mounted in said outlet and engaging said contact face and a wick distributed in said casing and having an oil transferring connection with said oil absorbent member.

9. In a mechanism of the character described having a bearing, an element rotatably supported by said bearing, a structure associated with said bearing and shaped to provide a receiving chamber having a lower contact face, an oil passage through said contact face and means for conducting oil from said passage to said bearing, a combination of elements mounted in said chamber and removable as a unit therefrom and comprising a casing shaped to be placed in said chamber and having a lower portion engaging and supported by said contact face and formed with an outlet opening upon said contact face, an oil absorbent element mounted in said outlet and engaging said contact face, a charge of lubricant in said casing and a wick distributed in said lubricant and having an oil transferring connection with said oil absorbent member.

10. In a mechanism of the character described having a bearing, an element rotatably supported by said bearing, a structure associated with said bearing and shaped to provide a receiving chamber having a lower contact face, an oil passage through said contact face and means for conducting oil from said passage to said bearing, a combination of elements mounted in said chamber and removable as a unit therefrom and comprising a casing shaped to be placed in said chamber and having a lower portion engaging and supported by said contact face and formed with an outlet opening upon said contact face, an oil absorbent element mounted in said outlet and engaging said contact face, a charge of oil bleeding grease in said casing and a wick distributed in said grease and having an oil transferring connection with said oil absorbent member.

11. A combination of elements applicable as a unit to a lubricating mechanism for bearings comprising a cartridge for lubricant having a discharge portion provided with an opening for the outflow of oil, an oil absorbent member attached to the cartridge and extending across said opening and a wick having an oil transferring connection with said member and distributed in said cartridge.

12. A combination of elements applicable as a unit to a lubricating mechanism for bearings comprising a cartridge for lubricant having a discharge portion provided with an opening for the outflow of oil, an oil absorbent member attached to the cartridge and extending across said opening, a wick having an oil transferring connection with said member and distributed in said cartridge and a cap for closing the portion of the cartridge relatively remote from the discharge portion.

13. A combination of elements applicable as a unit to a lubricating mechanism for bearings comprising a cartridge for lubricant having a discharge portion provided with an opening for the outflow of oil, an oil absorbent member attached to the cartridge and extending across said opening, a charge of lubricant in said cartridge, a wick having an oil transferring connection with said member and distributed in said cartridge and a cap for closing the portion of the cartridge relatively remote from the discharge portion.

14. A combination of elements applicable as a unit to a lubricating mechanism for bearings comprising a cartridge for lubricant having a discharge portion provided with an opening for the outflow of oil, an oil absorbent member attached to the cartridge and extending across said opening, a charge of oil bleeding grease in said cartridge, a wick having an oil transferring connection with said member and distributed in said cartridge and a cap for closing the portion of the cartridge relatively remote from the discharge portion.

WILSON M. ALFORD.

References Cited in the file of this patent

UNITED STATES PATENTS

| Number | Name | Date |
| --- | --- | --- |
| 2,402,565 | Madsen | June 25, 1946 |
| 2,449,574 | Wilcock | Sept. 21, 1948 |

FOREIGN PATENTS

| Number | Country | Date |
| --- | --- | --- |
| 128,798 | Australia | July 24, 1947 |